March 17, 1970  C. A. WILCOX ET AL  3,501,186
TRIM MOUNTING CLIP
Filed Jan. 14, 1969
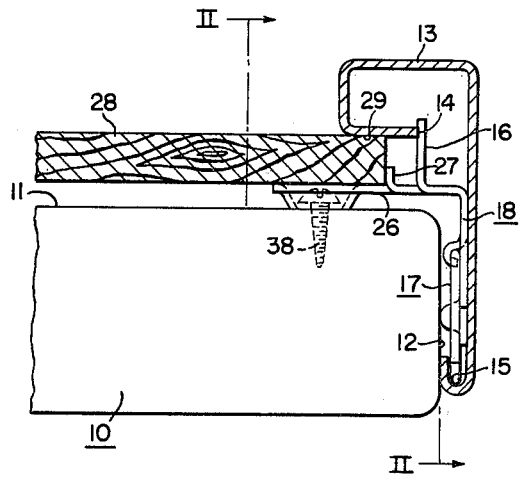
FIG.I.
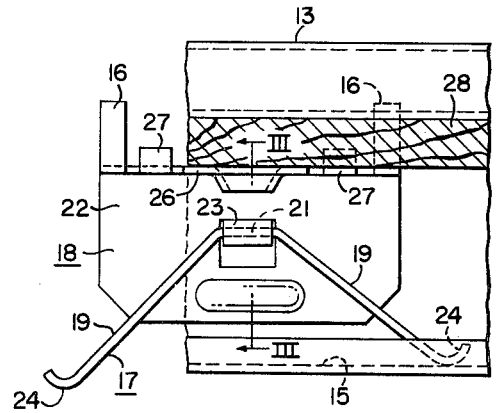
FIG.2.
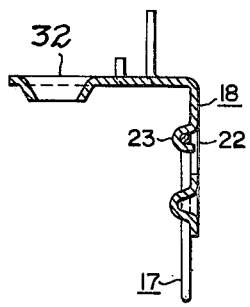
FIG.3
WITNESSES
INVENTORS
Charles A. Wilcox &
Carl L. Trump
BY
AGENT

United States Patent Office 3,501,186
Patented Mar. 17, 1970

3,501,186
TRIM MOUNTING CLIP
Charles A. Wilcox and Carl L. Trump, Columbus, Ohio, assignors to Westinghouse Electric Corporation, Pittsburgh, Pa., a corporation of Pennsylvania
Filed Jan. 14, 1969, Ser. No. 791,086
Int. Cl. F16b 5/06
U.S. Cl. 287—189.35                              6 Claims

ABSTRACT OF THE DISCLOSURE

Trim mounting structure for a refrigerator door, or the like, wherein a replaceable surface or front panel is captivated by the trim member. The mounting structure is characterized by a pair of complementary wall structures one of which is attached to one wall of the door and the other of which comprises a resilient member. The wall structure attached to the door has tabs which engage one end of the trim structure to be mounted, which tabs cooperate with the resilient member to retain the trim structure in place.

Background of the invention

This invention relates, in general, to trim mounting structure and, more particularly, to structure for mounting trim members utilized for captivating removable panels.

In their never ending endeavors to satisfy the many different tastes of the consumer, manufacturers of appliances such as refrigerators, ranges, etc. build units which are plain and simple and which are quite fancy. For example, some units have no embellishment on the exterior thereof while others are provided with rather straight forward chrome trim members and still others are provided with rather fancy trim as well as replaceable front surface panels. The replaceable panels enable the user to change the appearance of the appliance in accordance with the particular decorating scheme of the room where the appliance is utilized.

The panels mentioned above are usually captivated by the trim members and the latter are attached to the door by mounting brackets or clips which, in turn, are attached to the door or the like, by conventional fasteners such as screws.

Heretofore, such brackets or clips have been fabricated from solid metal and are, therefore, quite rigid and require flexing of the trim member during installation causing it to become distorted. Another disadvantage of the rigid clip, of the type employed where the trim captivates removable panels, is that variations in panel thickness must be accommodated by the trim member thereby adding to the distortion problem.

It is often desirable to sell an appliance with one type of trim or embellishment which can later be readily modified. For example, some appliances with a nominal amount of trim may simply have a trim strip or strips mounted on the front wall of the door. The trim strip may be simply a channel-shaped piece which is captivated by the heads of a plurality of screws in the front wall. Presently available mounting clips do not lend themselves to changing the foregoing type trim to the replaceable panel type installation hereinabove referred to.

Accordingly, the general object of this invention is to provide a new and improved mounting clip for trim members.

It is a more particular object of this invention to provide a new and improved trim mounting structure, of the type employed with removable panels captivated by the trim member, wherein the variation of panel thickness due to manufacturing tolerances is accommodated.

Another object of this invention is to provide a new and improved trim mounting structure which utilizes existing hardware for its attachment to the panel.

Brief summary of the invention

Briefly, the above-cited objects are accomplished by the provision of a clip having complementary wall structures which are provided with means engaging opposite edges of a trim member. One of the wall structures is adapted to be attached to one of two adjacent walls of a door, or the like, while the other of the wall structures is provided with a spring member which effectively renders the length of that wall structure adjustable whereby the trim can be readily installed and variations in thickness in a removable panel can be accommodated and a trim member can be installed without distortion.

The wall structure attachable to the door, or the like, has an aperture therein, through which a screw hole in the door is accessible by a screw. In one contemplated application of the present clip, the foregoing screw holes would constitute existing holes which would have had screws, the heads of which would have been utilized for captivating a channel-shaped trim strip mounted to the front wall of the door or the like.

Further objects and advantages of the present invention will become apparent from a description of the drawings and a detailed description of the preferred embodiment forming a part hereof.

Description of the drawings

FIG. 1 is an enlarged fragmentary view of a trim member and removable surface panel mounted on a door structure, or the like, by means of a mounting clip representing the invention;

FIG. 2 is a view taken along the line II—II of FIG. 1; and

FIG. 3 is a cross-sectional view of the mounting clip shown in FIG. 1 taken along the line III—III of FIG. 2.

Detailed description of the preferred embodiment

Referring now to the drawings, especially FIG. 1, reference character 10 designates generally a door structure, or the like, comprising a front or top wall 11 and an adjacent end wall 12.

Mounted on the door structure 10 is a trim member or structure 13 having a generally L-shaped configuration. The trim member has opposed edges or portions 14 and 15 which respectively engage a pair of flanges 16 and a resilient member 17 of a trim mounting clip generally indicated at 18.

The clip 18 is preferably fabricated from metal, however, it may be suitably made from other materials, for example, plastic. The resilient member 17 has a generally V-shaped configuration and comprises leg portions 19 and a bight portion 21 is captivated in, and forms a part of a wall structure 22. A stamped-out segment 23 (see FIG. 3) provides an opening in the wall structure 22 into which the free end of the stamped-out portion is bent, to thereby provide structure for retaining the resilient member. The leg portions are turned back as indicated at 24 to provide smooth surfaces in the area of contact of the leg portions with the trim member 13.

The clip 18 further comprises a complementary wall structure 26 comprising the flanges 16 and a pair of tabs 27. As can be seen in FIG. 1, the tabs 27 serve to position a removable surface panel 28 intermediate the wall 12 and a wall (not shown) at the opposite side of the structure 10. It can be seen that the panel 28 is held in a superimposed relationship to the wall 11 by a surface 29 of the trim members 13.

The clip 18 is attached to the wall 11, along with a plurality of other clips (not shown) by a single screw 38 inserted through an aperture 32 in the wall structure 26.

It will now be apparent that there has been provided a trim mounting clip having a pair of complementary walls, one of which is effectively adjustable for facilitating installation of the trim member 13. To this end, the leg portions 19 are movable toward the bight portion 21, through engagement of the bent portions 24 with the surface 15 and subsequent movement of the trim member in the direction of the wall 11. The resilient member is also rotatable clockwise as viewed in FIG. 1.

Since numerous changes may be made in the above apparatus and different embodiments may be made without departing from the spirit thereof, it is intended that all matter contained in the foregoing description or shown in the accompanying drawings, shall be interpreted as illustrative and not in a limiting sense.

What is claimed is:

1. Trim mounting structure comprising:
   a pair of complementary wall structures,
   one of said wall structures being adapted for attachment to one of a pair of complementary walls of a panel structure,
   said one of said wall structures comprising means for engaging one edge of a trim member,
   resilient means in the other of said complementary wall structures, said resilient means engaging the other of said walls of said panel structure and cooperating with said means engaging one edge of the trim member to attach said trim member to said panel structure.

2. Structure as specified in claim 1 wherein said resilient means has a substantially V-shaped configuration.

3. Structure as specified in claim 2 including means for securing said resilient means to said other of said wall structures, said securing means comprising a stamped-out portion of said other of said wall structures, said stamped-out portion being bent such that its free end extends at least partially into the aperture left by the stamped-out portion.

4. Structure as specified in claim 3 wherein said resilient means comprises a wire form having its extremities turned back towards the bight portion thereof.

5. Structure as specified in claim 1 wherein said one of said wall structures comprises a pair of flanges for locating a surface panel captivated by said trim member.

6. Structure as specified in claim 5, wherein said one of said complementary wall structures is provided with an aperture through which a fastener is insertable for attachment to said one of said walls of said panel structure.

References Cited

UNITED STATES PATENTS

| | | | |
|---|---|---|---|
| 2,947,048 | 8/1960 | Ellis | 52—718 X |
| 2,973,235 | 2/1961 | Saunders | 287—189.35 X |
| 2,980,478 | 4/1961 | Woehrle | 287—189.35 X |
| 3,060,535 | 10/1962 | Munse | 52—624 X |

J. KARL BELL, Primary Examiner

U.S. Cl. X.R.

24—73; 52—718; 312—204